Oct. 23, 1956 A. S. HARRIS 2,768,248

GAIN CONTROL CIRCUIT

Filed Sept. 14, 1951

INVENTOR
ALBERT S. HARRIS
BY [signature]
ATTORNEY 2,768,248
Patented Oct. 23, 1956

2,768,248

GAIN CONTROL CIRCUIT

Albert S. Harris, Fort Wayne, Ind., assignor to Farnsworth Research Corporation, Fort Wayne, Ind., a corporation of Indiana Application September 14, 1951, Serial No. 246,597

2 Claims. (Cl. 179—171)

This invention relates to volume control circuits for adjustably controlling output amplitude of electric signals from an amplifier.

Many different types of amplifier volume or gain control circuits have been proposed. The more usual types of volume controls generally rely upon the variation of the grid bias of an amplifier stage either by manual adjustment or by a negative voltage feedback which is applied to the input or grid circuit. Other types of volume control quite often used operate on the plate potential of an amplifier which again may be manually adjusted or controlled by the output feedback signals.

According to this invention there is provided a simple novel volume control circuit wherein an input signal is applied to an amplifier in different phase relationship and adjustments are provided to control the phasing and the relative amplitudes of the signals applied at these different phases. The invention may be considered as a system for controlling the output amplitude of input signals, including an amplifier device to which input signals are applied effectively in two different phase relationships together with an adjustable control for effectively adjusting the signals applied in one phase relationship with respect to the other.

According to a feature of this invention the system comprises an amplifying stage provided with an input cathode impedance and an input grid impedance over which signals are applied in effectively different phase relationships so that a relative balance may be achieved. The adjustment or control of the volume of the output signal is produced by varying the relative amplitude of the signals applied to the cathode circuit and to the grid circuit. This may be done by adjusting a control to change the amplitude of energy in the cathode impedance or by adjusting the amplitude of signals in the grid impedance, or a combination of both.

In accordance with one embodiment of the invention the control can be effected through the medium of a variable resistance tube. In this case the control can be made to vary the output amplitude of signals inversely, with respect to and in response to the amplitude of input signal energy.

Figure 1:
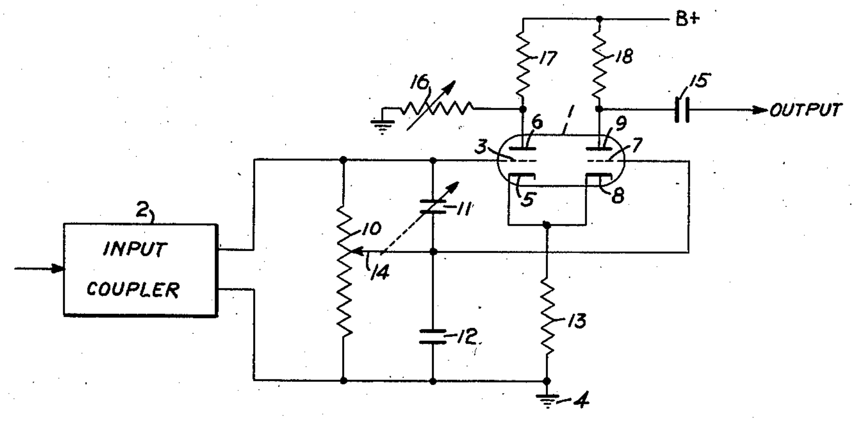
Figure 2:
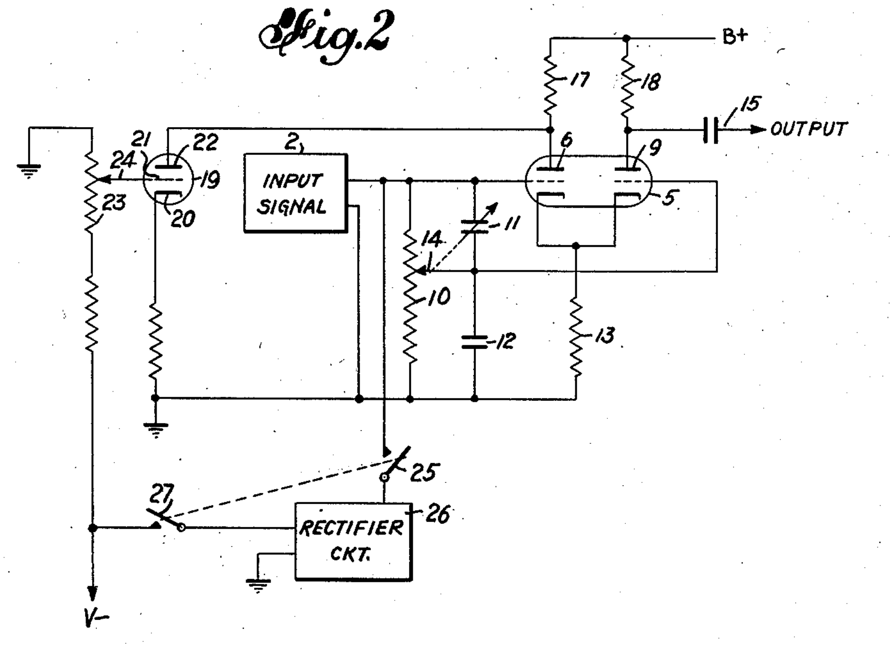

The above mentioned and other features and objects of this invention and the manner of attaining them will become more apparent and the invention itself will be best understood by reference to the following description of an embodiment of the invention taken in conjunction with the accompanying drawings, in which:

Figure 1 is a schematic diagram of a simple circuit arrangement embodying the feature of this invention and Figure 2 is a schematic diagram of an amplifier illustrating an alternative of this invention.

Turning first to Fig. 1, there is shown a tube 1 illustrated as a double triode, which may be replaced by separate amplifying tubes, or tubes having more electrodes than triodes. The signals to be amplified are applied over input coupler 2 between the grid 3 of the first section of tube 1 and a source of reference potential 4 shown conventionally as ground. The first tube section in addition to grid 3 comprises a cathode 5 and anode 6. The second tube section comprises grid 7, cathode 8 and anode 9. In the input circuit of the first section there is provided an impedance between the grid 3 and ground 4 comprising a resistor 10 and capacitors 11 and 12. A common resistor 13 is coupled between cathodes 5 and 8 and ground 4 so that the output of the first section of tube 1 is cathode coupled to the input of the second section of tube 1. It will be clear that signal energy applied to grid 3 will appear across cathode resistor 13 in the same phase as the applied signals. A voltage dividing slider 14 is provided connected to grid 7, so that energy of different amplitudes may be applied from resistor 10 to grid 7. Since the input energy is applied to the cathode 8, of the second section of tube 5, and also to its grid 7 in the same phase, it will be apparent that phase opposed effects will be produced at the anode 9. It is, therefore, clear that the ultimate output energy appearing in output line 15 will be a resultant of the signal balance between the input energy applied to impedance 13 and that applied to grid 7. By adjusting slider 14 the desired initial relationship can be obtained. In order to preserve the proper relationship upon adjustment of slider 14 condenser 11 is made variable and simultaneously adjusted so as to provide the same voltage division between condensers 11 and 12 as exists between the upper and lower sections of resistor 10. It will be apparent that adjustment of slider 14 will serve to vary the output signal volume. However, this is not the preferred manner of varying output level in accordance with the invention. Accordingly, there may be provided an additional shunt resistor 16 which is substantially in parallel with the anode impedance element 17 of anode 6 and the source of anode potential. To complete this circuit a further anode impedance 18 is provided for anode 9. In order to adjust the volume of the output signal it is then simply necessary to adjust resistor 16.

In the preferred method of operation the potentiometer slider 14 is first adjusted to give the desired level when the potential applied to anode 6 is maximum. Reduction of this voltage will thus increase the output signal energy. In a particular set-up of this arrangement the tests were run to show the variation in circuit attenuation with variation in applied plate potential. These values are set forth in the following table in which E*p*6 constitutes the voltage applied to plate 6. E*p*9 is the voltage applied to plate 9. E13 is the voltage appearing across cathode resistor 13. The fourth column is the input signal indicated in decibels below 1 volt for a constant output at plate 9 and the fifth is the circuit attenuation measured in decibels. The lower section of this same table is an indication of the output value when the slider 14 is moved to be connected to ground.

| E*p*6 | E*p*9 | E13 | Input db below 1 v. | Circuit att in db |
|---|---|---|---|---|
| 0 | 208 | 10.5 | 40 | 0 |
| 100 | 207 | 10.5 | 40 | 0 |
| 150 | 209 | 10.5 | 39.5 | 0.5 |
| 160 | 209 | 10.5+ | 38 | 2.0 |
| 170 | 211 | 10.7 | 34 | 6+ |
| 180 | 213 | 10.8 | 30 | 10 |
| 190 | 216 | 11.1 | 24 | 16 |
| 200 | 219 | 11.4 | 17+ | 23+ |
| 210 | 224+ | 11.7 | 8 | 32 |
| With Tap on 10 Turned to Ground | | | | |
| 234 | 235 | 12.4 | 40 | 0 |
| 190 | 216 | 11 | 39 | 1 |
| 180 | 213 | 10.8 | 37 | 3 |
| 170 | 210 | 10.7 | 34 | 6 |
| 160 | 209 | 10.6 | 26 | 14 |
| 150 | 209 | 10.55 | 15 | 25 |
| 140 | 209 | 10.5 | 4 | 36 |

It will be noted that the plate voltage at 9 varies somewhat with change in voltage at 6 due to the variation in grid bias of the grid 7 caused by these changes in current through resistor 13. This changes the plate current of the second section and consequently the D. C. drop in resistor 18. It will also be observed that the attenuation in decibels increases from zero to 32 decibels with a variation of from 100 to 210 volts applied to plate 6. With the slider 14 at ground it will be noted that the attenuation is lowest when the potential applied to plate 6 is greatest. It should also be stated that in these tests there was considerable distortion for the grounded position of slider 14 when the plate potential was reduced to 150 volts and greater distortion when it was reduced to 140 volts. It will be clear however that this circuit arrangement provided a very useful and simple type of gain control by balancing of signals.

In the embodiment shown in Fig. 2 the general elements of the system are substantially identical to those shown in Fig. 1 except that in place of adjustable resistor 16 there is provided a tube 19 having a cathode 20, grid 21 and plate or anode 22 and that there is provided a potentiometer 23 connected between the reference potential source, or ground, and a source of negative voltage. Grid 21 is connected by slider 24 to the potentiometer 23 so that the conduction and thus the effective resistance of tube 19 may be varied.

This type of circuit lends itself well to automatic volume control since the impedance effect of tube 19 may be readily controlled by variation in voltage applied to its grid 21. Thus as illustrated in the drawing input signals from source 2 may be applied over the switch 25 to a rectifier circuit 26 and hence over switch 27 to potentiometer 23. Thus the input signal may be rectified and applied to grid 21 so as to achieve an automatic volume control. In this case the negative potential need not be applied from an external source.

A test of this circuit was made as indicated in the following table, the five center columns of which correspond to the various columns as shown in the table previously given in connection with Fig. 1. The first column, however, marked E*g* indicates the voltage on grid 21 of tube 19 while the final column shows the variation in decibels for each unit voltage change in the first column:

| E*g* Volts | E*p*6 Volts | E*p*9 Volts | E13 Volts | E in db below 1 Volt | Att. Circuit, db | Increase of Ckt. Att., db |
|---|---|---|---|---|---|---|
| 0 | 130 | 209 | 10.4 | 40 | 0 | ------ |
| −3 | 157 | 209 | 10.4 | 39 | 1 | 0 |
| −4 | 165 | 211 | 10.5 | 37 | 3 | 2 |
| −5 | 174 | 212 | 10.6 | 34.5 | 5.5 | 2.5 |
| −6 | 182 | 214 | 10.7 | 31.5 | 8.5 | 3 |
| −7 | 189 | 216 | 10.9 | 28.5 | 11.5 | 3 |
| −8 | 196 | 218 | 11.0 | 25.5 | 14.5 | 3 |
| −9 | 203 | 222 | 11.3 | 22 | 18 | 3.5 |
| −10 | 209 | 224 | 11.4 | 19 | 21 | *3 |
| −11 | 212 | 225 | 11.5 | 17 | 23 | *2 |
| −12 | 217 | 228 | 11.8 | 14 | 26 | *3 |
| −13 | 223 | 230 | 11.9 | 11 | 29 | *3 |
| −14 | 227 | 233 | 12.1 | 9.5 | 30.5 | *1.5 |
| −15 | 232 | 235 | 12.5 | 9.5 | ------ | ------ |

* E*g* measured on different meter scale.

From the table it will be noted that the increase of circuit attenuation with respect to voltage applied to the grid 21 is substantially constant at three decibels per volt between the values E*g*=−6 to E*g*=−13 volts. Also, the increase in circuit attenuation divided by the change in E*p*6 is equal approximately to .5 decibel per volt over the sample range.

One advantage of the circuit in accordance with my invention is that there is very low distortion at high attenuation. This distortion is much less than that produced by a variable mu pentode in the customary gain control circuits using a grid bias for controlling gain. If linear change in attenuation with variation in input signal amplitude is desired, then the rectifier circuit can be arranged to follow approximately the logarithmic law of the control circuit. Circuits to produce such logarithmic output are well known in the prior art and it is, therefore, considered unnecessary to give a detailed description thereof.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A volume control system comprising first and second amplifier stages each having cathode, grid and anode electrodes, a common cathode resistor connected to each of said cathode electrodes and to a reference potential source, an impedance network comprising a resistor and shunt connected capacitors connected between the grid electrode of said first amplifier and said reference potential source, means for applying input signals across said impedance, means variably connected to said impedance network and to the grid electrode of said second amplifier stage, anode potential supply means for both said anode electrodes, and an output lead coupled to the anode electrode of said second amplifier, said variably-connected means comprising means for varying the division of resistance and capacitance across said resistor and said capacitors equally.

2. A volume control system comprising first and second amplifier stages each having cathode, grid and anode electrodes, a common cathode resistor, connected to each of said cathode electrodes and to a reference potential source, an impedance network comprising a resistor and shunt connected capacitors connected between the grid electrode of said first amplifier and said reference potential source, means for applying input signals across said impedance, means variably connected to said impedance network and to the grid electrode of said second amplifier stage, anode potential supply means for both said anode electrodes, an output lead coupled to the anode electrode of said second amplifier, and means for adjustably controlling the anode potential supplied to the anode of said first amplifier, said variably-connected means comprising means for varying the values of the impedance network resistance and capacitance in such proportion as to produce equal voltage drops across each.

References Cited in the file of this patent

UNITED STATES PATENTS

| | | |
|---|---|---|
| 1,869,331 | Ballantine | July 26, 1932 |
| 2,179,263 | Koch | Nov. 7, 1939 |
| 2,227,050 | White et al. | Dec. 31, 1940 |
| 2,273,143 | Roberts | Feb. 17, 1942 |
| 2,343,207 | Schrader et al. | Feb. 29, 1944 |
| 2,363,985 | Moser | Nov. 28, 1944 |
| 2,434,904 | Busignies | Jan. 27, 1948 |